Aug. 25, 1931.  V. LOUGHEED  1,820,814
SCREW PROPELLER
Filed May 20, 1929  3 Sheets-Sheet 3

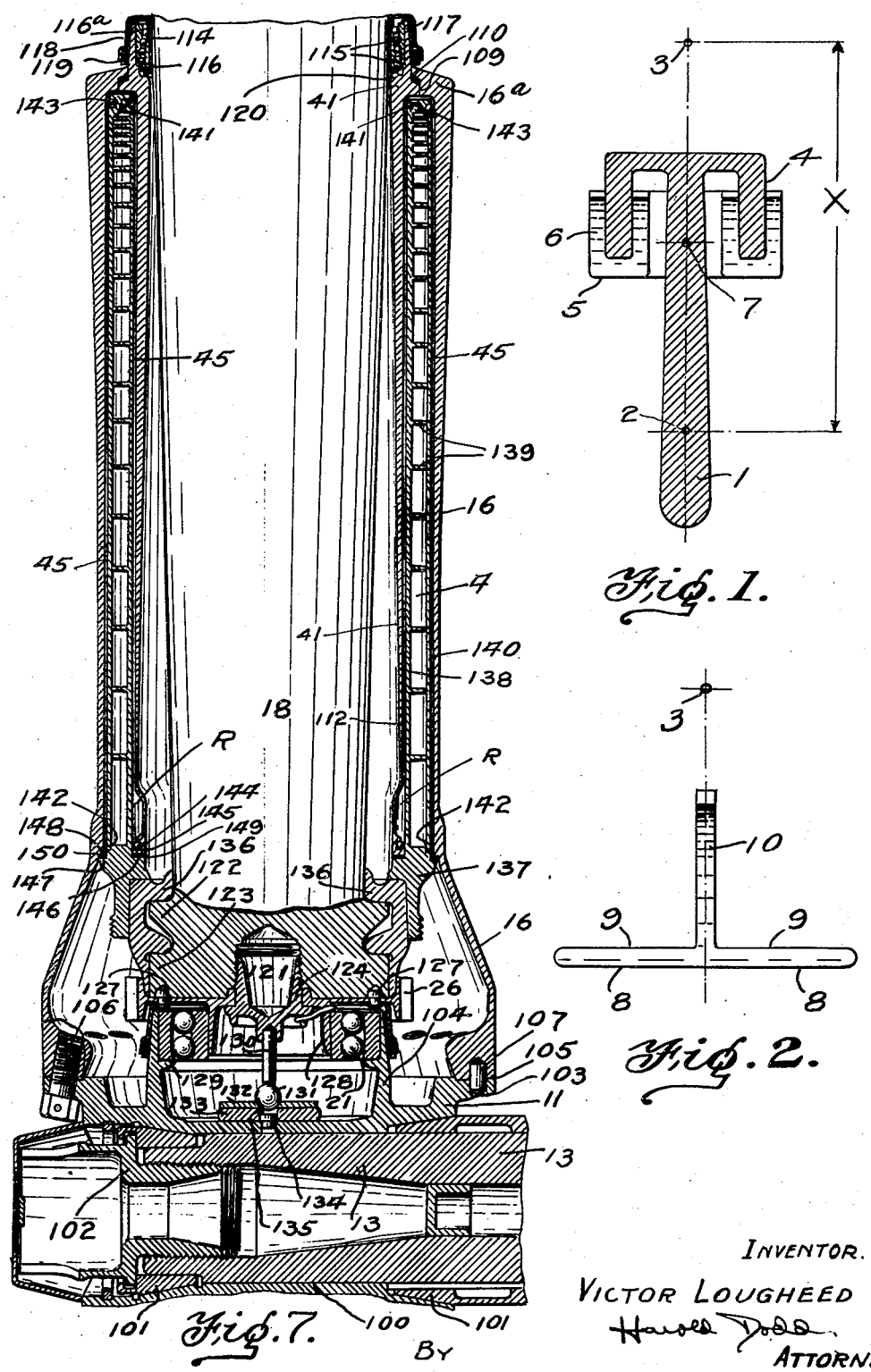

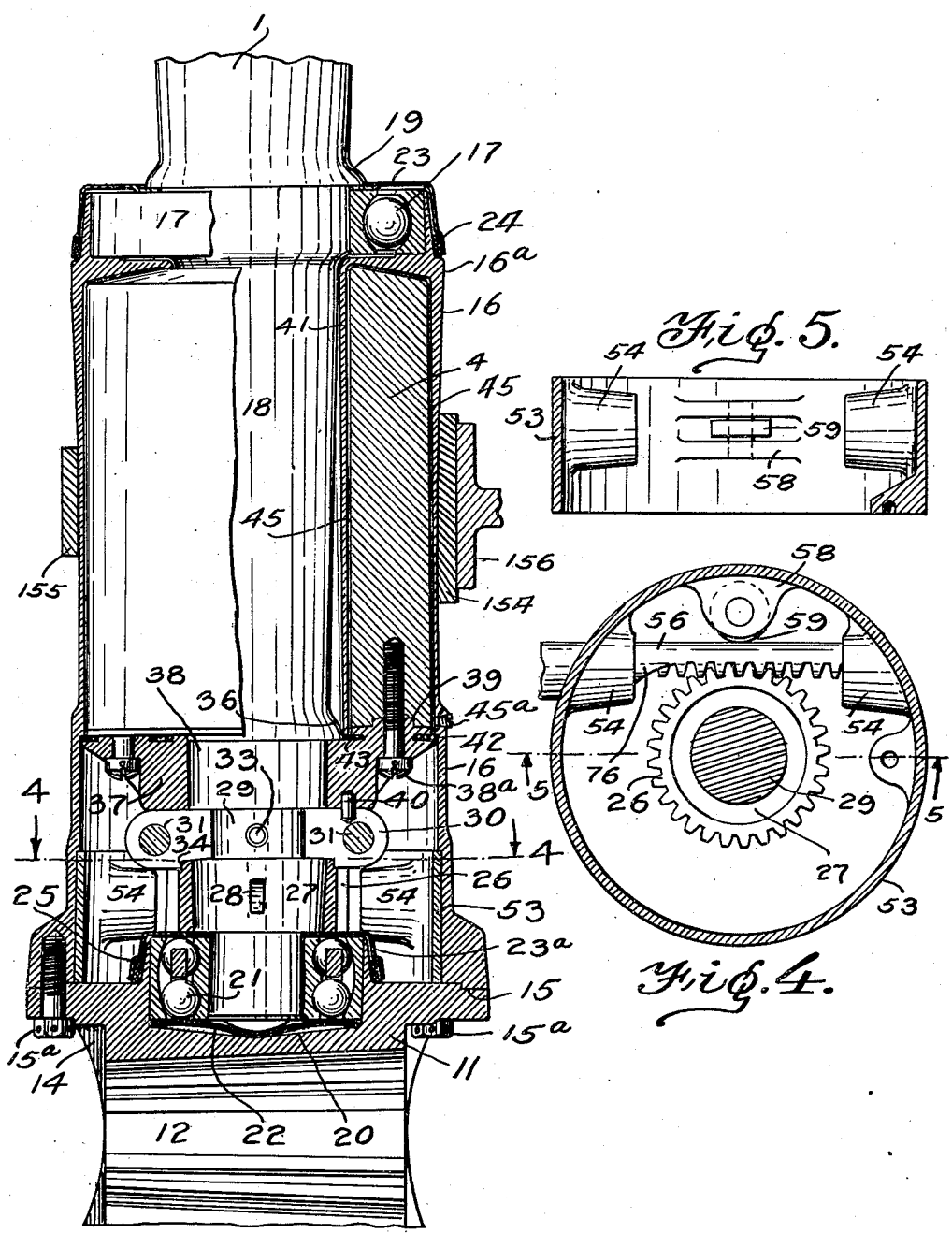

INVENTOR.
VICTOR LOUGHEED
By Harold Todd
ATTORNEY

Patented Aug. 25, 1931

1,820,814

UNITED STATES PATENT OFFICE

VICTOR LOUGHEED, OF WASHINGTON, DISTRICT OF COLUMBIA

SCREW PROPELLER

Application filed May 20, 1929. Serial No. 364,536.

This application is in part a continuation of my earlier application Serial Number 296,610, filed July 31, 1928, for screw propellers.

My invention relates broadly to screw propellers and more particularly to reversible pitch propellers.

The object of my invention is a simple and ruggedly constructed propeller, the blades of which are freely and unfailingly rotatable at the pilot's will from one angular position to another by moderate muscular or other effort.

Another object of my invention is to produce a propeller the blades of which are floated in a liquid which will not only produce a substantially frictionless bearing surface but will also exert upon the blade a pressure radially inward toward the hub of the propeller in an amount substantially equal to the centrifugal force of the blades when in rotation.

A further object of my invention is to so construct a propeller of this type that the force exerted upon the blades of the propeller by the liquid and tending to force the blade toward the center of rotation so that the blade flotation at all times is substantially constant irrespective of the speed of the revolution of the propeller.

A further object of my invention is to balance the centrifugal component in each blade and attached elements by an opposing centripetal force, which at all times can be made to act substantially equally and oppositely to the centrifugal force, regardless of the velocity of rotation, and which through its surface of opposition introduces no appreciable friction to resist the actuating means.

Further objects of my invention will appear more fully hereinafter as the description of the method and apparatus is developed.

The primary problem is variable-pitch and reversible-blade propeller design is consequent upon the extreme magnitude of the centrifugal forces acting to pull the blades out of the hub.

Centrifugal force, which with an air propeller turning at 1,800 revolutions a minute, for example, and with a blade weight of 20 pounds regarded as being located at a radius of 3 feet from the center of rotation, reaches a value of over 33 tons, is so great that even the most-efficient ball and roller bearings the sizes and weights of such bearings adequate to carry the load are prohibitive. Moreover, the energy requisite to produce angular rotation of the blades, mounted even in the best of such anti-friction bearings, with the propeller turning at full speed is found to be much greater than any effort it is reasonably possible to exert by hand, or through any remote-control servo mechanism except such as have been found too massive or complicated to be practical.

This force, so enormous in contrast even to the maximum weights and proportions allowable in the parts of an aviation propeller, heretofore has defeated every attempt to provide bearings really adequate to carry it, and yet light enough in weight and of sufficiently-low friction coefficient to permit angular blade movement at the pilot's will, without delay, and without unreasonable physical effort.

There are also serious secondary problems—of providing free blade movability without introducing such looseness or lost motion as must permit vibration and thus occasion failure of the structural elements, the materials of which in established propeller practice are stressed uncomfortably close to their limits of strength; and, generally, of building the hub and mounting the movable blades in such a manner that the structure cannot fly to pieces.

My invention consists substantially in the construction, combination and arrangement of parts associated in my improved propeller as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which:—

Figures 1 and 2 are diagrammatic illustrations of the principles upon which my invention is founded, Figure 3 shows one blade of a two bladed propeller of my invention, removed from its driving shaft, and with the essential inner elements pertaining to the upper bladecross and broken sectioned, while the elements for the lower blade are broken away. The blades proper are not shown, because they may be of any suitable form or construction, and because their form beyond the blade shanks may vary with the design of the blade for any specific use.

Figure 4 is a section on the line 4—4, Figure 3.

Figure 5 is a sectional view on the line 5—5 of Figure 4.

Figure 7 is a detail cross-sectional view of my invention as applied to a propeller for a Curtiss long-nose Wasp engine and is drawn to scale of an actual propeller subjected to test.

Figure 6:
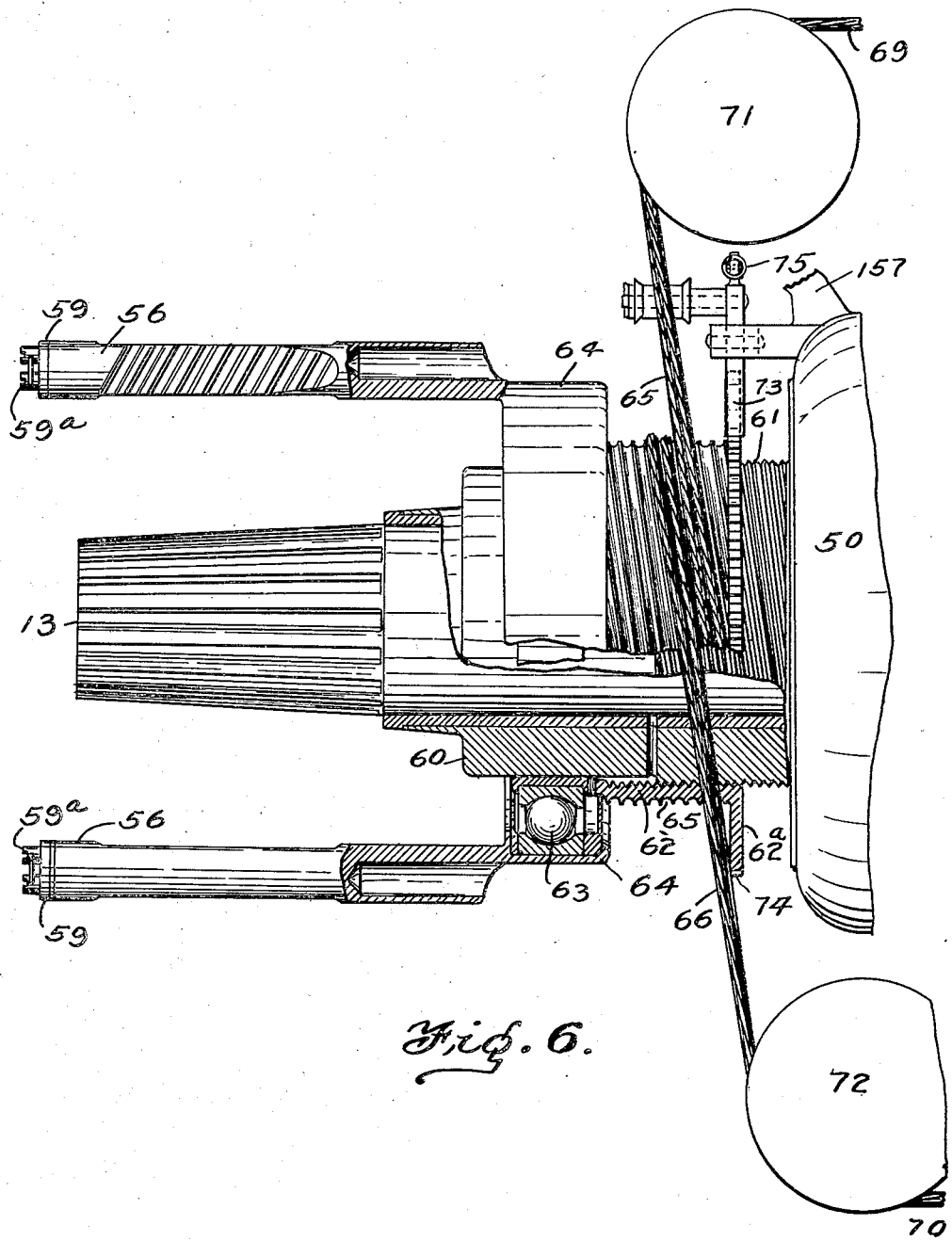
Figure 6 is a detail view of my blade actuating mechanism.

Referring particularly to Figure 1, numeral 1 designates a propeller blade the radius of gyration of which with attached elements can be designated as 2 at the distance X from the center of rotation 3. The blade carries an annular float 4 surrounded by an annular cup 5. This cup 5 is filled with a liquid 6 such as mercury or liquid gallium so that under the static condition shown the blade 1 and its float 4 are suspended by the weight of the liquid displaced. When the elements of the system are thus balanced, the liquid 6 forms an annular fluctuation element of U-shaped cross-section.

The float must be constituted of light metal or molded composition which will not amalgamate with or be pervious to the mercury or the particular liquid used, and which must be strong enough to endure the crushing effect of hydrostatic pressure. It may be made either solid, as shown in Figure 3 of light material, or hollow as shown in Figure 7. The possibility is contemplated of developing a construction of thin-walled metal reinforced by the use of wood inserts or some hard light plastic.

It does not suffice, however, for the present purpose, merely to float the propeller blades 1 and attached elements statically in the position illustrated in Figure 1.

Instead, to balance out the centrifugal force in the blade when it is revolved around the center of rotation 3, an amount of flotation must be secured that, to the weight to be balanced, must be in the inverse ratio that the distance from the center of revolution 3 to the radius of gyration 7 of the mercury bears to the distance from the same center of revolution 3 to the radius of gyration 2 of the blade plus its attached elements.

The amount of flotation, however, bears no necessary relation to the actual amount or weight of mercury used. Rather, it is a function of this weight plus the weight of mercury that can be regarded as displaced by the float 4.

For example, let it be considered that the float or rotor 4 with its attached blade is removed, and the space it leaves in 5 filled up with mercury. Swinging the annular cup 5 around the center of revolution 3 then will produce a centrifugal pressure against each unit of bottom area of the cup 5, which will be in proportion to the length of the radius from the center of revolution 3 to the radius of gyration of the mercury factored into the velocity of revolution, factored into the length of the vertical column parallel to the radius. This centrifugal pressure will not involve as a factor the actual weight of the mercury—though of course it does involve its specific gravity or density. Therefore with the annular cup 5 modified into the form sketched in Figure 2, the pressure on the bottom 8 as well as against the other inside lower surfaces 9, in accordance with Pascal's law, will be the same for the same unit area as it is in the preceding case, under similar conditions of centrifugal force, and with the mercury column 10 of the same height as the depth of the mercury in Figure 1.

This opposing pressure being the hydrostatic pressure of a confined liquid subjected to centrifugal force, its actual magnitude chiefly involves, not its mass but the area against which it acts, regarded as projected transversely to the blade axle. It therefore concerns the height of the column 10 or the amount of liquid displaced by the float 4 rather than the cross-section of the column 10 or the amount of liquid that is left surrounding the float 4, so theoretically the amount of liquid required can be reduced to an infinitely small amount, and in actual practice to a very small quantity, the latter determined solely by the closeness of the clearances it is mechanically practical to machine and maintain between the float 4 and the cup 5. Hence the balancing of the centrifugal force in the case of my invention calls for no intolerable weight increase in the mechanism.

The correctly-calculated quantitative conditions fulfilled, therefore, the most minute quantity of mercury disposed in columns of proper height, or length, between the cup or stator cylinder 5 and the float 4, and acted upon by centrifugal force, will produce in the closed end of the stator cylinder 5 a hydrostatic pressure which, acting inwardly against the bottom surface of the float 4, can at all speeds of revolution exactly counteract or balance the centrifugal force in the blades and attached masses. At the same time, the contact of the liquid with the solid surfaces, even under the considerable pressures that may be involved with the propeller up to speed, will not add any appreciable friction to the otherwise very small resistances there are to overcome to effect the free angular rotation of the blade 1, the float 4 and the elements attached to them.

Referring particularly to Figure 3, the hub proper designated as 11 is seen to be pierced with a tapered hole 12, for mounting on a standard splined driving shaft 13 of Figure 6. The threads shown at 14 are for the application of a "wheel puller," to facilitate the removal of the hub from the shaft 13.

To this hub 11, accurately located by the steps turned in the matching contact faces 15, the cylindrical stator elements 16 are securely held by the locked-wired circles of special capscrews 15a. These capscrews are spaced as closely as considerations of leaving wrenchroom will allow, and should be smoothly and accurately produced to high finish and close machining accuracy; should be of heat-treated alloy steel, filleted where the shanks join the undersize heads.

In the outer end of each stator cylinder 16, there is mounted with a light press fit the outer race of annular ball bearing 17, which surrounds and helps center the shank 18 of the propeller blade 1. The flange 19 on the blade shank prevents this bearing from flying radially outward under the influence of centrifugal force. The rating of this bearing is premised upon the thrust and torque loads developed in the propeller blade. This bearing does however in normal operation, as will presently appear, carry a very moderate thrust load directed centripetally, inward, and communicated to its inner race by the flange 19.

Into a recess 20 bored in the face shown of the hub 11, the outer race of the double-row, self-aligning, annular ball bearing 21 is fitted with the usual "sucking" fit, while its inner race, as in the case of the bearing 17, is made a light press fit on the propeller-blade shank 18. This bearing should be of the same radial-load capacity, under the same conditions of naught revolutions, as that of bearing 17. It similarly carries radial load only—except for a moderate thrust load, outwardly, imposed against its outer race by the heavy laminated star spring 22.

These two bearings serve accurately to center the propeller-blade shank through the stator cylinder 16, and to take all radial loads upon the blade, which tend to move it out of center.

The bearing 17 is protected by the light pan-like cover 23, which is clamped between its inner race and the flange 19, so that it serves to exclude moisture and dirt, and to prevent the lubricant in the bearing from being centrifuged out, a similar pan-like cover 23a serving similar function for the bearing 20.

At 24 and 25 are soft felt washers to improve the closure against the egress of lubricant and the ingress of water and dust, while at the same time occasioning no appreciable friction to resist rotation. The wedging effect due to centrifugal force acting on these washers keeps them particularly tight while the propeller is in operation.

It is to be noted that the edges of the cover 23 and the contained felt washer 24 are of smaller diameter than the outer end 16a of the stator cylinder 16. Hence water or dirt falling or ice forming on the surface of 16 tend to be thrown centrifugally past rather than against 23 and 24.

At 26 is a helical spur gear, forced on the tapered diameter 27 of the blade shank 18, which is compelled to turn with it by two opposite woodruff keys, the seat for one of which appears at 28. One of these keys thicker than the other, this gear always must go in its original angular position.

The blade shank 18 is milled to its smallest diameter, at 29, and is embraced by the split collar 30, which is slightly tapered on its inner face, which fits against the similar taper of the groove 29 in the blade shank 18. Hence when this split collar is tightly clamped by its bolts 31, the whole assembly is compelled to pull up snug, with no possible looseness. This is most important because the entire centrifugal load of the propeller blade and attached elements pulls against and is transmitted through this split collar 30, the shank condition being essentially that of a bolt under tension, the stem diameter of the bolt being represented by the small diameter at 29, while the bolt head is represented by the tapered annular ring 27 of the blade shank 18.

Replacement of the split collar 30 always in the same angular position is insured by the tapered pin key 33, engaging with one of its halves.

An undercut recess 34 turned in the split collar 30 engages a similar undercut on the gear 26 and thus precludes loosening and dropping back of the latter on the taper.

Between the outer side of the split collar 30 farthest from the hub 11 and an annular shoulder 36 on the blade shank 18 is an annular member 37 which is lightly forced on the tapered portion 38 of the blade shank 18. This taper is larger than, though of the same angle as that at 27, so that annular member 37 easily passes over the latter.

To this annular member or float carrier 37 is attached, by the lock-wire screws 38a the float 4, accurate concentric location being secured by the step groove at 39.

The annular member 37 is maintained in fixed relation to the split collar 30 by means of a pin 40. In this manner the float 4 is rigidly affixed to the shank 18 of the blade 1.

All of these precautions to preserve the original angular relationships of the several assembly elements are designed to preserve true concentric location of the float 4 within the stator cylinder 16 and to maintain perfect alignment of the blade shank 18 with the axis of the stator cylinder 16.

The stator cylinder with the reentrant section 41 and the float 4 should be absolutely out of contact with each other at all times and at every point. These parts nevertheless are made to approach each other to the closest clearances compatible with reasonable machining accuracy and finish, concentricity and mounting of the members of the bearings 17 and 21, allowance for any possible minute lost motion, and a proper consideration of the size-changing and distorting effects of expansion and contraction due to alterations in temperature at which the propeller may be exposed.

The correct amount of mercury is introduced into the space 45 through a hole which is closed by a small tapered screw plug 45a.

Leakage of the mercury from its enclosing space, when the blade 18 is stopped with the stator cylinder 16 in an inverted position, is effectively prevented by the compression of the rubber washers 42 and 43 in contact with the stator cylinder 16 and its reentrant portion 41, respectively, by the laminated star spring and by the fact that they have only to oppose the very small hydrostatic pressure of a few inches of mercury acting against the exceedingly small area of ends of the clearance spaces 45 between the stator cylinder 16, the reentrant section 41 and the float 4.

Referring particularly to Figures 3–6, numeral 50 designates the crankcase of an engine which carries my improved blade actuating mechanism, mounted around the driving shaft 13. This actuating mechanism, while an essential component of my invention, is of principal present interest because it suggests how the light, quick-acting manual control, manipulated with only moderate effort, is applicable to reverse or vary the blades of my propeller.

Within the stator cylinder 16 and close to the hub 11 is provided a rackshaft guide ring 53, with a close machine fit to the stator casing 16. Upon this guide ring are two bosses 54 carrying bearings, in which are mounted rackshafts 56. This rackshaft engages the helical gear 26, as is clearly shown in Figure 4. Upon the rackshaft ring 53 and radially past the point at which the rackshaft engages the helical gear 26, I have provided a bearing mounting 58, which carries either a ball bearing or a roller bearing, as shown at 59. This roller bearing insures positive engagement of the rackshaft 56 with the helical gear 26 at all times. The friction that would result were mesh maintained solely by the plain sliding surfaces through the bosses 54 thus is considerably reduced, and lost motion between the gear and rack teeth minimized. Because the outer ends of the rackshafts, if left fully round, could not pass the gears 26, when entered into the holes in 54, their tooth-bearing sides are flattened off to allow the requisite clearance. Then, after they are in place, with the propeller assembled on the shaft 13, the filler pieces 59 are applied to them and secured in place by the wired screws 59a.

The gears 26 and racks 56 are cut with helical instead of with straight, spur teeth so as to maintain at all times smooth progressive operation without backlash, lost motion, or shifting of tooth leverage, which might cause vibration or blade flutter.

The crankcase 50 of the engine carries a cylindrical bearing housing 60 which is threaded as shown at 61. In engagement with these threads I have provided a sleeve or drum 62, which at its outer end and inner diameter bears slidably and rotatably upon the housing 60. Upon the outer end and outer diameter of the sleeve 62 is fastened by spinning the inner race of the ball bearing 63. The outer race of the ball bearing 63 is carried by an annular member 64 which carries the rack shafts 56, which engage the gears 26 as shown in Figure 4. The outer surface of the sleeve 62 is grooved as shown at 65 to enable positive engagement of cables 66 thereon.

The multiple thread at 61 is of a pitch high enough to afford full traverse of the gears 26 by the rackshafts 56, with only a moderate angular movement of the drum or sleeve 62— preferably with less than one full revolution. At the same time the pitch is low enough to afford an irreversible mechanism—that is, end pressure from the rackshafts 56 cannot cause the drum or sleeve 62 to turn.

The duplication in each of the cable pairs 66 is simply to provide the utmost precaution against any element of the device failing. Making the cable grooves 65 on the outer surface of the drum 66 of the same pitch as that of the multiple threads on its inside allows the cable pairs always to come from the same point 67 and lie at the same angle to the pulley wheels 71 and 72 which direct the cables 66 to the cockpit of the plane.

Because even the low rolling friction in the bearing must tend to turn the drum or sleeve 60 in the direction of rotation, and because of the further possibility of this bearing failing, and since the control lock on the cables 69 and 70 may be remote from the drum 62, I have provided a more positive lock in close proximity to the drum to hold the drum 62 in any given position. This lock I have shown as a pawl 73, engaging with the ratchet 74, cut in a flange 62a on the drum. The effect of this pawl and ratchet is to allow free rotation of the sleeve or drum 62 in the direction opposite to that of the driving shaft 13 but rotation in the same direction as that of the driving shaft can occur only as a result of a pull on the cable pair 66, the tension of these cables, as soon as it reaches a certain critical value, working against the tension of the spring 75 and lifting the pawl 73 out of engagement with the ratchet 74, thus freeing the drum to turn in the direction of the pull. On the other hand, frictional drag on the drum 62 through the bearing 63 can only tighten the cable pair 66 against the remote point at which it is secured. The effect of this, or of the breakage of the cables, is to slack the pair 69, with the result that the tension of the spring 75 positively forces the pawl 73 into the ratchet 74 and prevents undesired rotation.

As a still further precaution, the direction of the thread 61, in its relation to the direction of shaft rotation, is made such that any conceivable failure of the control means, which might allow the sleeve or drum 62 to screw off the housing 60, can progress only to the point of increasing the blade angles to the maximum pitch the mechanism is designed to allow, at which point the possibility of further motion is excluded by the abutment of the curved surface shown at 76 on the rackshaft 56.

Referring to Figure 7 of the drawings, which shows a cross-section of one hub element of my improved propeller, as developed for tests, numeral 13 designates a shaft of a Wasp long-nose engine, which carries the usual lands 100 and wedged mounting members 101. The numeral 11 designates the hub proper of my improved propeller, which also carries lands and blanks, for engagement with the lands and blanks upon shaft 13. This hub is securely mounted upon the shaft 13 by means of the wedge members 101 and a threaded nut 102. My improved hub carries two annular rings 103 and 104. The annular member 103 has stepped faces shown at 105, upon which is mounted a stator casing 16, secured thereto and located thereon by means of a circle of wired capscrews 106 and dowel pins 107. The stator casing 16 as it radially extends outward from the hub 11 gradually increases in thickness in proportion to the internal pressure exerted thereon, as will be hereinafter described. The outer end 16a of the stator casing 16 is formed with a shouldered extension radially inward from the larger diameter of the stator casing 16. The inner diameter of this annular ring is stepped as shown at 109, and is made a press fit at 110 for engagement with a reentrant sleeve or member 41. The reentrant member is thickened at its outward portion to provide strength to resist the internal pressure thereon as will hereinafter be described.

The portion 112 of the reentrant member 41 is thinned away as it approaches the hub 11, because the pressure is not so great at this point and one of the necessities in all propeller construction is to make a structure as light as practicable. The extreme outer portion of the reentrant member 41 is provided with an annular sleeve 117 which serves as a mounting for the ball bearing 114 which corresponds to the bearing 17 shown in Figure 3.

As shown, this bearing is provided with circles of balls 115 between inner and outer races 116 and 116a respectively. This bearing is provided with a sealing cover 118 and two packings 119 and 120 which serve an identical purpose as that of 24 of Figure 3. The bearing race 116 fits upon the shank 18 of the standard propeller blade. This shank is provided with the usual annular clamping rings 122 and 123.

As shown, I have provided a screw threaded depression 121 into the base of the shank 18, into which is screwed a clamping member 124, which serves to hold the helical gear 26 securely in engagement with the base of the propeller shank 18. This gear 26 is also secured against torsion by means of a circle of studs 127. The gear 26 carries an inner annular ring 128 which is concentric with the annular ring 104 of the hub. Between the rings 128 and 104 I have placed the bearing 21, held therein against a flange 129 by spinning or crimping over of the outer edge of 104. The threaded member 124 carries a bearing pin 130, which extends from member 124 along the axis of the shank 18 toward the center of the shaft 13. Between the end of this bearing and the hub 11 I have mounted a ball 131 centered in a plate 132 which resiliently holds the ball 131 against the end of the pin 130 by means of a resilient member 133.

The opposite bearing surface for the ball 131 I have shown as a plug at 134 spaced from the ball with a slight clearance as shown at 135. These elements serve the same function as the star spring 22 of Figure 3. Around the shank 18 of the propeller blade and in engagement with the annular ring 122 and 123 are segmental elements 136 of the shape shown. These elements 136 are forced into the tapered bore in and against the seat on 137, which is an extension of or rigidly secured to the float 4. This float extends between the stator casing 16 and the reentrant member 41 with the minimum practicable clearance, so that there is no friction between the float 4, the stator casing and its reentrant member 41. This float is made up of a sleeve 140 and an internal core 138, machined integral with the annular member 137.

This core 138 carries integrally therewith a plurality of bulkheads 139, spaced from each other distances corresponding to the centrifugal hydrostatic pressure gradient along the float 4 when the propeller is turning. Around this core 138 and bulkheads 139 is the sleeve 140, which is expanded by heat and pressed over the bulkheads 139, and is welded to the core 138 at points 141 and 142. To assure maintenance of the float 4 in its centralized position between the stator element 16 and its reentrant portion 41, I have provided circles of small ball bearings shown at 143 and 144, bearings 143 bearing between the outer side of the float 4 and the stator cylinder 16, while the bearing balls 144 are between the float 4 and the edge of the reentrant portion 41 which is here provided with a stiffened annular rib 145, as shown.

This annular rib 145 forms the rim of a reservoir R formed between the float 4 and the reentrant member 41 by making the reentrant member 41 of smaller diameter at its innermost portion than at points farther removed from the shaft 13. This reservoir is of such size that the height of the column of mercury in the space 45 is maintained substantially constant irrespective of temperature change or of slight deformation of the stator cylinder 16, its reentrant portion 41, or of the float 4 when under extreme pressure gradient at high operating speeds.

Mercury is introduced into the annular space 45 and the reservoir R in measured quantity similar to the manner described with reference to Figure 3.

As machined, the annular ring 137 is provided with two stepped surfaces 146 and 147, which correspond to the flat surface of the annular ring 145 and the step 148 turned upon the stator casing 16. Between the annular ring 145 and the surface 146 I have provided a packing element 149 and between the surfaces 147 and 148 I have provided a second packing 150. These packings serve a similar purpose to those designated 42 and 43 in Figure 3.

Referring again to Figure 2 and the description thereof, it is apparent that along the column 10 there is a gradation in pressure, a greater pressure being at a distance more removed from the center of rotation 3. Similarly, when the space 45, which surrounds float 4 and lies between the float 4 and the stator casing 16 and the float 4 and the reentrant member 41, is filled with mercury and the propeller is rotating at high speed, the pressure gradient increases along the float as the distance of the particular section of the float to be considered is removed from the center of rotation of the shaft 13. For this reason the bulkheads 139 are spaced at a less distance apart at the outer portion of the float 4 than those near the hub. Likewise, the stator member 16 and its reentrant member 41 are thickened at their outer portions in order to withstand the great pressure exerted thereon by the mercury when the propeller is under rotation.

The rackshafts 56 of Figure 6 are maintained in engagement with the gear 26 in a manner very similar to that shown and described with reference to Figures 3 to 6 with the exception that the bosses 54 and the bearing therein are mounted directly upon the stator cylinder 16.

Referring again to Figure 3, I have provided a friction plate 154 which surrounds the drive shaft 13 and is rigidly clamped to the stator cylinder 16 by means of clamping element 155. Against this friction plate 154 is resiliently pressed a friction brake shoe 156. This shoe may be mounted upon the crank case 50, as indicated at 157 in Figure 6. These elements are unnecessary to a propeller of my design unless it is to be used in a region where the prevailing temperature is below that of 40 degrees below zero either Fahrenheit or centigrade, the solidifying temperature of mercury. Such a device would be sufficient to maintain the mercury in liquid form. Since this is merely an accessory to my invention it is easily adaptable to the modified form shown in Figure 7 and it is thought unnecessary to describe it in detail with reference thereto.

The operation of my device is as follows:

After the propeller starts turning, as soon as the centrifugal force acting on the mercury reaches a value sufficient to balance the attraction of gravity the mercury is thrown away from the possible leak points under the washers. This occurs at a very moderate speed—at fifty-four revolutions a minute, for example, with the mercury moving around a two-foot circle.

As the speed of rotation goes higher than this, it in exact proportion to the centrifugal force builds up the hydrostatic pressure that pushes centripetally against the end of the float 4, to balance the centrifugal force which is acting to throw the blades outwardly, with their other attached weights.

The centripetal effect of the mercury is designed to be sufficient measurably to overbalance the blade and its attached weights, and also the tension of the resilient member which exerts a radial pressure, so that as soon as the mercury is thrown away from the rubber washers by a safe margin of speed, the centripetal force compresses this resilient member slightly and so retracts the washers off of their seats.

The amount of this retraction is designedly limited to a few thousandths of an inch. A first effect of this few thousandths movement is to eliminate the braking drag that the rubber washers oppose to angular rotation of the blades when the propeller is not running. Thus, contrary to all other variable-pitch and reversible-blade propeller schemes, with the propeller of my invention the blades may turn freely at any speed of propeller revolution, but do not so be turned when it is not revolving. Another and most important effect of this inward movement of the blades, as my propeller starts revolving, is that this movement can be made to impose any desired thrust load on the bearings 17 and 115, which has the effect of eliminating all the possible lateral play or movement it might allow the blade shank if loaded radially only. The moderate thrust load imposed on the bearings 21 centrifugal force acting against the inner race and balls thereof, alone or in conjunction with spring pressure similarly closes up all possible lost motion between the balls and the ball races in this bearing. A factor which otherwise might cause serious blade flutter and vibration is thus eliminated.

It is to be noted that any vibration or flutter of the blade is opposed by the dashpot action of the mercury surrounding the float. This action is produced by the structure as shown so that lateral movement of the blade and its float cannot occur without proportionate displacement of the mercury film which surrounds the float, which film, under the condition of centrifugal pressure prevailing in it, together with its high mass inertia when the blade is in rotation, opposes being squeezed out with the maximum resistance peculiar to a metal having a high density.

The pitch of the blades 1 may therefore be set at any desired angle by a slight movement of the cables 66 at the will of the pilot.

While the particular embodiment of my invention shown in the drawings herewith is of a two-bladed propeller, my invention is equally applicable to multibladed constructions.

It will be understood that the above description and accompanying drawings comprehend only the general and preferred embodiment of my invention and that detail changes in the construction and arrangement of parts may be made within the scope of the appended claims without sacrificing any of the advantages of my invention.

It is to be further understood that the term "mercury" as used herein is to be construed to include liquid amalgams.

Having thus described my invention what I claim is:—

1. In a variable pitch propeller, the combination of a hub, radially-mounted angularly-rotatable blades mounted thereon, means within the hub for carrying a liquid, means upon the blade for displacing a portion of said liquid whereby the liquid exerts a centripetal pressure upon said blades counteracting the centrifugal pressure thereof when under revolution.

2. In a variable pitch propeller, the combination of a hub, radially-mounted angularly-rotatable blades mounted thereon, said hub having a reentrant portion, a liquid within the reentrant portion, and a float upon the blade and extending within the reentrant portion to displace a portion of the liquid whereby the liquid exerts a centripetal pressure upon said blade substantially equal to the centrifugal pressure thereof when the propeller is revolved.

3. In a variable pitch propeller, the combination of a hub, radially-mounted angularly-rotatable blades mounted thereon, said hub having a reentrant portion, a small quantity of mercury retained within said hub by the reentrant portion and a float upon the blade and extending between the reentrant portion and the hub to displace a portion of said mercury, whereby the mercury exerts a centripetal pressure upon the said blade substantially equal to the centrifugal pressure thereof when the propeller is revolved at operating speeds.

4. In a variable pitch propeller, the combination of radially extending blades, a flotation member surrounding the base of each blade and spaced therefrom, a hub having mounting elements for each blade and reentrant members upon each of said mounting elements, said reentrant members extending between the blade and its respective flotation member and a liquid between the flotation member and the mounting element and its reentrant member.

5. In a variable pitch propeller, the combination of a hub, radially extending stator cylinders rigidly mounted thereon, reentrant members rigidly carried thereby and forming annular cups with said stator cylinders, liquid within said annular cups, blades, the shanks of which extend toward the hub in axial alignment with the annular cup, and annular flotation members carried by the shanks of said blades and extending within the annular cup whereby a portion of the liquid therein is displaced.

6. In a variable pitch propeller, the combination of a hub, radially extending stator cylinders rigidly mounted thereon, reentrant members rigidly carried thereby and forming annular cups within said stator cylinders, the said cups opening radially inward toward the hub, a liquid within said annular cups, blades, the shanks of which extend radially inward toward the hub and through the center of said annular cup, and annular flotation members carried by the shanks of said blades and extending within the annular cups whereby a portion of the liquid therein is displaced.

7. In a variable pitch propeller, the combination of a hub, radially extending stator cylinders rigidly mounted thereon, reentrant members rigidly carried thereby and forming annular cups within said stator cylinders, the said cups opening radially inward toward the hub, a liquid within said annular cups, blades, the shanks of which extend radially inward toward the hub and through the center of said annular cup, and means between the flotation members and the stator casings and between the flotation members and the reentrant members whereby the liquid is retained within the annular cups when in inverted position.

8. In a propeller, the combination of radially-mounted angularly-rotatable blades, flotation elements mounted thereon and a liquid surrounding said flotation elements whereby the liquid when subjected to centrifugal force acting outwardly, produces a centripetal hydrostatic pressure, acting inwardly, upon said flotation elements to maintain said blade in flotation at operating speeds of revolution.

9. In a propeller with a hub and two or more blades, two or more vessels immovably affixed to the hub and containing liquid mercury, and two or more floats and propeller blades secured thereto mounted in the hub so as to be angularly-rotatable, the vessels and the floats being so shaped and disposed that the float in each vessel can rotate angularly within it, whereby upon revolution of the propeller centrifugal force acting upon the mercury in each vessel balances centrifugal force acting on the float in the same vessel.

10. In a variable-pitch or reversible blade propeller, with a hub and radially-mounted, angularly-rotatable blades; bearings for carrying the centrifugal load of the propeller while permitting the free angular rotation of the blades; liquid mercury films within said bearings, the pressure within said mercury films automatically increasing by centrifugal force in substantially the same proportion that the loads upon said mercury films are increased by centrifugal force acting upon the blade.

11. In a variable pitch or reversible-blade air propeller having a hub and radially-placed angularly rotatable blades; annular vessels or cups within said hub and surrounding said blades; an annular float element surrounding and attached to each blade and located within but not contacting with said annular cup or vessel; and a mercury film surrounding said float within said cup or vessel; the design and configuration of said film being substantially that of a "U".

12. In a variable pitch propeller, a hub, bearings therein, radially-mounted angularly-rotatable blades carried thereby and a single means between each blade and said hub for relieving the centrifugal thrust of said blades upon said bearings and substantially eliminating lateral flutter or vibration of said blades, said means consisting of a float upon said blade, an annular cup within said hub and surrounding said float and a liquid within said cup and surrounding said float.

13. In a variable pitch propeller, a hub, bearings therein, radially mounted angularly-rotatable blades carried thereby and a single means between each blade and said hub for relieving the centrifugal thrust of said blades upon said bearings and substantially eliminating lateral flutter or vibration of said blades, said means consisting of a float upon said blade, an annular cup within said hub and surrounding said float and a film of mercury within said cup and surrounding said float.

14. In a variable-pitch or reversible propeller, the combination of a hub, bearings therein, radially-mounted angularly-rotatable blades carried thereby, means for relieving the centrifugal thrust of said blades upon said bearings when said propeller is rotating, said means consisting of a float carried by each of said blades, an annular cup within said hub and surrounding said float, a film of mercury within said cup and surrounding said float and means for angularly moving said blades within said bearings when said propeller is revolving.

15. In a variable-pitch or reversible propeller, the combination of a hub, bearings therein, radially-mounted angularly-rotatable blades carried thereby, means for relieving the centrifugal thrust of said blades upon said bearings when said propeller is revolving, said means consisting of a float carried by each of said blades, an annular cup within said hub and surrounding said float, mercury within said cup, a gear carried by each of said blades and means for angularly moving said blades within said bearings, said means consisting of thrust element revolvable with said propeller, racks thereon and in engagement with said gears and means for moving said thrust element toward or away from said hub to angularly rotate said blades within said hub.

VICTOR LOUGHEED.